United States Patent

[11] 3,616,192

[72] Inventor James R. Sinclair
 Charlotte, N.C.
[21] Appl. No. 8,750
[22] Filed Feb. 4, 1970
[45] Patented Oct. 26, 1971
[73] Assignee Riegel Paper Corporation
 New York, N.Y.
 Continuation-in-part of application Ser. No. 732,258, May 27, 1968, now abandoned, Continuation-in-part of application Ser. No. 484,809, Sept. 3, 1965, now abandoned.

[54] DECORATIVE POLYVINYL FLUORIDE LAMINATIONS
 7 Claims, No Drawings
[52] U.S. Cl. .................................................. 161/184,
  156/277, 156/330, 161/6, 161/189, 161/190,
  161/413, 260/835
[51] Int. Cl. ........................................................ B32b 27/30,
  B44f 9/02, D06n 3/12
[50] Field of Search ......................................... 161/3, 5, 6,
  184, 189, 190, 214, 216, 409, 413; 156/277, 278,
  310, 313; 260/835

[56] References Cited
UNITED STATES PATENTS

| | | | |
|---|---|---|---|
| 3,051,598 | 8/1962 | Chipman et al. | 161/409 |
| 3,133,854 | 5/1964 | Simms | 161/189 |
| 3,228,823 | 1/1966 | Usala et al. | 161/189 |
| 3,322,605 | 5/1967 | Frech | 156/277 |
| 3,325,344 | 6/1967 | Semancik et al. | 161/254 |
| 3,397,108 | 8/1968 | Hecht et al. | 161/164 |

Primary Examiner—John T. Goolkasian
Assistant Examiner—Geroge W. Moxon, II
Attorney—Mandeville and Schweitzer

ABSTRACT: A printing ink formulation including a blend of a polyester resin and epoxy resin is disclosed for use on polyvinyl fluoride films. The printed polyvinyl fluoride films may be used as the outer layer in laminate structures, where the inert properties of polyvinyl fluoride are desired. In such a laminate structure, the printed surface of the polyvinyl fluoride film is joined to a substrate such as a polyvinyl chloride layer by a laminating adhesive that is based on a polyester resin that is the same as or similar to the polyester resin component of the printing ink formulation.

DECORATIVE POLYVINYL FLUORIDE LAMINATIONS

RELATED APPLICATIONS

This application is a continuation-in-part of application Ser. No. 732,258, filed May 27, 1968, entitled "Postformable Lamination," which is a continuation-in-part of application Ser. No. 484,809, filed Sept. 3, 1965, entitled "Reformable Metal Lamination," both of which are now abandoned.

BACKGROUND OF THE INVENTION

The invention pertains to the utilization of polyvinyl fluoride films in the formation of laminates or webs.

The very advantageous properties of polyvinyl fluoride films, such as their excellent resistance to weathering, high degree of physical toughness and chemical inertness, are well known. These properties make polyvinyl fluoride films very suitable for use as the outer layer of a laminate which is to be exposed to outdoor weathering conditions. The substrate of such a laminate can be chosen to suit the application and may include plastic webs, metals and wood. It is also well known in the art that because of its chemical inertness, it is quite difficult to adhere polyvinyl fluoride films to any of the aforementioned substrates.

The Usala et al. U. S. Pat. No. 3,228,823 and the Simms U.S. Pat. No. 3,133,854, are disclosive of many types of polyvinyl fluoride laminates for various applications and teach specific adhesive formulations for joining polyvinyl films to substrates. These patents also teach the desirability of activating the surface of the polyvinyl fluoride film to make it more receptive to adhesive bonding.

SUMMARY OF THE INVENTION

The present invention relates to printing ink formulations suitable for use in printing the surface of a polyvinyl fluoride film. The new printed polyvinyl fluoride films can advantageously be used as the outer layer of a decorative laminate that will be exposed to weathering such as the decorative side panels used on automobiles. Decorative automobile side panels can be made in accordance with the invention by printing a simulated woodgrain pattern onto one surface of a clear polyvinyl fluoride film and laminating the printed film to a vinyl plastic substrate by adhesively joining the printed surface of the polyvinyl fluoride film to the vinyl plastic layer. The foregoing laminate structure takes advantage of the excellent weather-resistant properties of polyvinyl fluoride film to protect the decorative design and to prevent its deterioration by weather exposure. Of course, the substrate to which the printed polyvinyl fluoride film is laminated can be any one of those previously mentioned, and is chosen in view of a particular final application.

To make the polyvinyl fluoride film receptive to the new printing ink formulation, the surface of the film to be printed is activated, such as by the chemical means described in the aforementioned Usala et al. patent. The chemical activation method taught by the Usala patent includes the formation of functional groups selected for the group including hydroxyl, carboxyl, carbonyl, amino, amido, and ethylenically unsaturated radicals on the film surface.

The printing ink of the invention is formulated from an epoxy resin and a polyester resin, the specific color of the ink being obtained through the addition of conventional pigmentation. The presence of the epoxy resin is believed to improve the "wetting characteristics" of the polyvinyl fluoride film and thereby improve adhesion of the ink to the film surface, and is not thought to chemically react with the polyester component. The weight ratio of the polyester to epoxy resin may range from approximately 90/10 to approximately 45/55, with 50/50 being preferred.

The polyester resin utilized in the new printing ink can be chosen from the group including polyethylene isophthalate, polyethylene hexahydroterephthalate, copolyester of ethylene terephthalate and ethylene isophthalate, copolyester of ethylene terephthalate and ethylene hexahydroterephthalate or any mixture of the foregoing resins. Resins of this type that are suitable for use in the new ink formulation are described in U. S. Pat. No. 2,961,365, which also teaches their preparation.

A further aspect of the invention is the production of a polyvinyl fluoride film-vinyl plastic laminate wherein the polyvinyl fluoride film is reverse-printed in a decorative pattern such as woodgrain. Laminates of this type are very advantageous for use as decorative simulated wood panels on automobiles. The vinyl plastic layer of the laminate is typically adhered to the metal body of the automobile by a pressure-sensitive adhesive of the type commonly used to bond vinyl films to metal.

In accordance with a specific aspect of the invention, the adhesive used to laminate the reverse-printed polyvinyl fluoride film to the vinyl substrate must be compatible with the printing ink. Accordingly, the laminating adhesive used in fabricating the new laminate is based on a polyester resin the same or similar to that used in the printing ink formulation. In the laminating step, which typically includes the application of heat and pressure to the joined web, the laminating polyester adhesive is cross-linked with an isocyanate additive to provide improved thermal and chemical properties to the finished laminate.

DESCRIPTION OF PREFERRED EMBODIMENTS

In accordance with the invention, decorative polyvinyl fluoride laminates may be obtained by first printing the desired decorative pattern on a surface of the polyvinyl fluoride film utilizing the new and improved ink formulation. Most advantageously, the surface of the polyvinyl fluoride film is chemically activated before being printed. Suitable chemical activation procedures are known in the art and are taught in the previously mentioned Usala, et al. and Simms United States patents. The polyvinyl fluoride film is available from E. I. du Pont de Nemours & Co. under the trade designation "Tedlar" and are preferably utilized in very thin gauges, i.e., not more than about 2 mils.

After the ink formulation has dried on the polyvinyl fluoride film, the printed film may be laminated to a suitable substrate, preferably a semiplasticized sheet of vinyl plastic such as polyvinyl chloride. In accordance with the invention, the printed surface of the polyvinyl fluoride film should be the interior surface that is adhesively joined to the substrate. In this laminate structure, the new ink formulation and the laminating adhesive are adjacent one another, and in contact and should be chemically and physically compatible. Accordingly, the invention provides that the laminating adhesive be based on a polyester very similar, if not identical to, the polyester resin component of the ink formulation.

In accordance with a specific aspect of the invention, the preferred printing ink formulation is prepared by blending equal parts, by weight, of solids of a polyester resin and an epoxy resin. The specific color of the ink is obtained through the use of conventional pigmentation.

The polyester resin used in the new printing ink is obtainable by reacting a polymethylene glycol having from 2–10 carbon atoms per molecule with one or more of the dicarboxylic acids chosen from the group including isophthalic acid, hexahydroterephthalic acid, a mixture of terephthalic acid and isophthalic acid, a mixture of terephthalic acid and hexahydroterephthalic acid and a mixture of terephthalic acid, isophthalic acid and hexahydroterephthalic acid, under polyester-forming conditions well known in the art. The U. S. Pat. No. 2,961,365 teaches the preparation of polyester resins of this type. A preferred polyester resin is available from the E. I. du Pont de Nemours & Company under the trade designation "Resin Number 47000." This polyester resin is nontacky and has a melting range of from 245° to 275° F. This same company offers this polyester resin in solution form containing 20±2 percent polyester solids in dioxane hydrocarbon solvent, under the trade designation "Adhesive Number 46956."

The epoxy resin ingredient of the new printing ink is a brominated high molecular weight epichlorohydrin bisphenol A-type resin having an epoxide equivalent weight of about 500 and a bromine content between about 18 and 20 percent. A preferred epoxy resin from this class is obtainable from the Dow Chemical Company under the trade designation "DER 511."

The laminating adhesive utilized in joining the printed surface of a polyvinyl fluoride film to a vinyl plastic substrate is preferably based on the same polyester resin as used in the printing ink formulation, except with slightly tacky characteristics and with a melting range between about 175° and 212° F. A preferred laminating polyester resin is available in solid form from E. I. du Pont de Nemours & Company under the trade designation "49001" and in solution form with 30±2 percent resin solids in a ketone solvent under the trade designation "46960." An isocyanate additive is incorporated in the laminating adhesive for promoting cross-linking during the laminating step, which includes the application of heat and pressure to the joined webs. The isocyanate cross-linking agent is preferably the reaction product of trimethyol propane and toluene diisocyanate and may be added to the polyester resin in quantities ranging from 2 percent to 10 percent, preferably 5 percent to 7 percent, based on solids of polyester resin. If a background for the printed pattern on the polyvinyl fluoride film is desired in the final laminate, suitable pigmentation may be added to the adhesive formulation.

An advantageous produce that may be obtained through use of the new printed polyvinyl fluoride films are decorative side panels for automobiles. To fabricate decorative side panels for automobiles, a simulated woodgrain pattern is printed on a surface of the polyvinyl fluoride film with the new printing ink. Several layers of ink may have to be applied to definite areas of the film to obtain the color and grain pattern of a particular woodgrain.

After the ink has dried, the printed surface of the polyvinyl fluoride film is solvent coated with a laminating adhesive in accordance with the invention. Typically, the laminating adhesive is tinted to provide a simulated wood background for the grain pattern printed on the polyvinyl fluoride film.

The preprinted adhesive coated polyvinyl fluoride film is passed through a drying oven which flashes the solvent off and then joined with a calendered polyvinyl chloride film in a conventional laminating process, which includes hot nipping the polyvinyl fluoride and vinyl film together at a temperature between about 180° and 240° F.

The resulting laminate has a long lasting decorative appearance since the printed surface is protected by a layer of polyvinyl fluoride film and cannot be scratched, marred, peeled, stained, or otherwise damaged, as is often the case with conventional printed patterns. The woodgrain polyvinyl fluoride vinyl lamination can be applied to the metal side panel of an automobile by utilizing a suitable vinyl plastic metal adhesive, preferably of the pressure-sensitive type.

It is to be understood, of course, that the invention herein illustrated and described is intended to be representative only, as certain changes may be made therein without departing from the clear teachings of the disclosure. Accordingly, reference should be made to the following appended claims in determining the full scope of the invention.

I claim:

1. A decorative laminate web comprising
   a. a substrate of vinyl plastic material,
   b. a layer of polyvinyl fluoride film,
   c. said film having a decorative coating on at least a portion of one side,
   d. a laminating adhesive,
   e. said one side being joined to said vinyl plastic material by said laminating adhesive,
   f. said decorative coating including a polyester resin component and an epoxy resin component in a weight ratio of from about 90/10 respectively to about 45/55 respectively,
   g. said polyester resin being chosen from the group consisting of polyethylene isophthalate, polyethylene hexahydroterephthalate, copolyester of ethylene terephthalate and ethylene isophthalate, copolyester of ethylene terephthalate and ethylene hexahydroterephthalate,
   h. said epoxy resin being chosen from the group consisting of brominated high molecular weight epichlorohydrin bisphenol A-type resins having an epoxide equivalent weight of about 500 and a bromine content between about 18 and 20 percent.
2. The laminate of claim 1, wherein
   a. said decorative pattern being a pattern of random variegation simulating the appearance of woodgrain, and
   b. said laminating adhesive includes a pigmentation component.
3. The laminate of claim 1, wherein
   a. said laminating adhesive includes the reaction product of a polyester resin and an isocyanate curing agent.
4. The laminate of claim 1, wherein
   a. said substrate is a calendered film of polyvinyl chloride.
5. A decorative laminate web comprising
   a. a substrate of vinyl plastic material,
   b. a layer of polyvinyl fluoride film,
   c. said film having a decorative coating on at least a portion of one side,
   d. a laminating adhesive,
   e. said one side being joined to said vinyl plastic material by said laminating adhesive,
   f. said decorative coating including a polyester resin component and an epoxy resin component in a weight ratio of from about 90/10 respectively to about 45/55 respectively,
   g. said laminating adhesive including the reaction product of a polyester resin and an isocyanate curing agent,
   h. said decorative coating being a pattern of random variegation simulating the appearance of woodgrain.
6. The laminate of claim 5, wherein
   a. said polyester resin is chosen from the group consisting of polyethylene isophthalate, polyethylene hexahydroterephthalate, copolyester of ethylene terephthalate and ethylene isophthalate, copolyester of ethylene terephthalate and ethylene hexahydroterephthalate.
7. The laminate of claim 5, wherein
   a. said epoxy resin is chosen from the group consisting of brominated high molecular weight epichlorohydrin bisphenol A-type resins having an epoxide equivalent weight of about 500 and a bromine content between about 18 to 20 percent.

* * * * *